United States Patent
Murata et al.

(10) Patent No.: US 12,505,033 B2
(45) Date of Patent: Dec. 23, 2025

(54) CALCULATION PROCESSING APPARATUS AND CALCULATION PROCESSING METHOD

(71) Applicant: CANON KABUSHIKI KAISHA, Tokyo (JP)

(72) Inventors: Yutaka Murata, Kanagawa (JP); Masami Kato, Kanagawa (JP); Tsewei Chen, Tokyo (JP); Motoki Yoshinaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/633,240

(22) Filed: Apr. 11, 2024

(65) Prior Publication Data
US 2024/0345945 A1  Oct. 17, 2024

(30) Foreign Application Priority Data
Apr. 12, 2023 (JP) .................................. 2023-064773

(51) Int. Cl.
*G06F 12/02* (2006.01)
(52) U.S. Cl.
CPC .................. *G06F 12/023* (2013.01)
(58) Field of Classification Search
CPC ........ G06F 12/02; G06F 12/00; G06F 12/023; G06F 12/0207; G06F 12/0284;
(Continued)

(56) References Cited

U.S. PATENT DOCUMENTS 11,347,430 B2 * 5/2022 Wakino ................... G06F 3/061
2018/0197067 A1 * 7/2018 Mody ....................... G06N 3/08
(Continued)

FOREIGN PATENT DOCUMENTS

JP 2021168095 A 10/2021
WO WO-2008153194 A1 * 12/2008 ............... G06N 3/08
WO WO-2008153196 A1 * 12/2008 ............... G06N 3/08

OTHER PUBLICATIONS

"Array Unit," in The Massively Parallel Processor, MIT Press, 1985, pp. 150-169.*
(Continued)

*Primary Examiner* — Pierre Michel Bataille
(74) *Attorney, Agent, or Firm* — Canon U.S.A., Inc. IP Division

(57) ABSTRACT

An apparatus includes memories hold feature planes each corresponding to a corresponding layer of layers in a neural network, a calculation unit performs calculation processing on the feature planes, and a memory control unit reads a feature plane from any of the memories and input the feature plane to the calculation unit, and writes a feature plane output from the calculation unit to any of the memories. In a case where feature planes corresponding to different layers are connected and the calculation processing is performed, the memory control unit writes the feature planes to be connected, in memories other than a specific memory among the memories, reads the feature planes to be connected, from the memories other than the specific memory and inputs the feature planes to the calculation unit, and writes the feature plane output from the calculation unit in the specific memory.

11 Claims, 11 Drawing Sheets

(58) Field of Classification Search
CPC .... G06F 2212/1016; G06F 2212/1044; G06N 3/063; G06N 3/0464; G06N 3/045
See application file for complete search history.

(56) References Cited

U.S. PATENT DOCUMENTS

| | | | | |
|---|---|---|---|---|
| 2018/0285719 | A1* | 10/2018 | Baum | G06F 5/01 |
| 2020/0394516 | A1* | 12/2020 | Chen | G06F 18/2413 |
| 2021/0004667 | A1* | 1/2021 | Wakino | G06T 1/20 |
| 2021/0011653 | A1* | 1/2021 | Wakino | G06N 3/045 |
| 2021/0090682 | A1* | 3/2021 | Tokutomi | G11C 11/5642 |
| 2023/0153615 | A1* | 5/2023 | Xu | G06N 3/08 |
| | | | | 706/15 |
| 2023/0206069 | A1* | 6/2023 | Zhang | G06N 3/045 |
| | | | | 706/15 |
| 2023/0289572 | A1* | 9/2023 | Xiao | G06V 10/764 |

OTHER PUBLICATIONS

P. Kotilainen, J. Saarinen and K. Kaski, "Neural network computation in a parallel multiprocessor architecture," Proceedings of 1993 International Conference on Neural Networks (IJCNN-93—Nagoya, Japan), Nagoya, Japan, 1993, pp. 1979-1982.*

* cited by examiner

FIG.4

| CNN CALCULATION NUMBER | INPUT FEATURE PLANE | | | OUTPUT FEATURE PLANE | | |
|---|---|---|---|---|---|---|
| | FEATURE PLANE NUMBER | BUFFER HEAD ADDRESS (MEMORY NUMBER) | BUFFER SIZE | FEATURE PLANE NUMBER | BUFFER HEAD ADDRESS (MEMORY NUMBER) | BUFFER SIZE |
| FIRST CNN CALCULATION | FIRST FEATURE PLANE | ADDR1 (FIRST MEMORY) | L1 | SECOND FEATURE PLANE | ADDR2 (SECOND MEMORY) | L2 |
| SECOND CNN CALCULATION | SECOND FEATURE PLANE | ADDR2 (SECOND MEMORY) | L2 | THIRD FEATURE PLANE | ADDR3 (FIRST MEMORY) | L3 |
| THIRD CNN CALCULATION | THIRD FEATURE PLANE | ADDR3 (FIRST MEMORY) | L3 | FOURTH FEATURE PLANE | ADDR4 (SECOND MEMORY) | L4 |
| FOURTH CNN CALCULATION | FIRST FEATURE PLANE | ADDR1 (FIRST MEMORY) | L1 | FIFTH FEATURE PLANE | ADDR5 (THIRD MEMORY) | L5 |
| | SECOND FEATURE PLANE | ADDR2 (SECOND MEMORY) | L2 | | | |
| | THIRD FEATURE PLANE | ADDR3 (FIRST MEMORY) | L3 | | | |
| | FOURTH FEATURE PLANE | ADDR4 (SECOND MEMORY) | L4 | | | |

FIG.7

| CNN CALCULATION NUMBER | INPUT FEATURE PLANE | | | OUTPUT FEATURE PLANE | | |
|---|---|---|---|---|---|---|
| | FEATURE PLANE NUMBER | BUFFER HEAD ADDRESS (MEMORY NUMBER) | BUFFER SIZE | FEATURE PLANE NUMBER | BUFFER HEAD ADDRESS (MEMORY NUMBER) | BUFFER SIZE |
| FIRST CNN CALCULATION | FIRST FEATURE PLANE | ADDR1 (FIRST MEMORY) | L1 | SECOND FEATURE PLANE | ADDR2 (SECOND MEMORY) | L2 |
| SECOND CNN CALCULATION | SECOND FEATURE PLANE | ADDR2 (SECOND MEMORY) | L2 | THIRD FEATURE PLANE | ADDR3 (FIRST MEMORY) | L3 |
| THIRD CNN CALCULATION | THIRD FEATURE PLANE | ADDR3 (FIRST MEMORY) | L3 | FOURTH FEATURE PLANE | ADDR4 (SECOND MEMORY) | L4 |
| FOURTH CNN CALCULATION | FIRST FEATURE PLANE | ADDR1 (FIRST MEMORY) | L1 | FIFTH FEATURE PLANE | ADDR5 (THIRD MEMORY) | L5 |
| | SECOND FEATURE PLANE | ADDR2 (SECOND MEMORY) | L2 | | | |
| | THIRD FEATURE PLANE | ADDR3 (FIRST MEMORY) | L3 | | | |
| | FOURTH FEATURE PLANE | ADDR4 (SECOND MEMORY) | L4 | | | |
| FIFTH CNN CALCULATION | FIFTH FEATURE PLANE | ADDR5 (THIRD MEMORY) | L5 | SIXTH FEATURE PLANE | ADDR6 (FIRST MEMORY) | L6 |
| SIXTH CNN CALCULATION | SIXTH FEATURE PLANE | ADDR6 (FIRST MEMORY) | L6 | SEVENTH FEATURE PLANE | ADDR7 (THIRD MEMORY) | L7 |
| SEVENTH CNN CALCULATION | SEVENTH FEATURE PLANE | ADDR7 (THIRD MEMORY) | L7 | EIGHTH FEATURE PLANE | ADDR8 (SECOND MEMORY) | L8 |
| EIGHTH CNN CALCULATION | EIGHTH FEATURE PLANE | ADDR8 (SECOND MEMORY) | L8 | NINTH FEATURE PLANE | ADDR9 (THIRD MEMORY) | L9 |

FIG. 8

| CNN CALCULATION NUMBER | INPUT FEATURE PLANE | | | ADDITIONAL INPUT FEATURE PLANE LINK | | OUTPUT FEATURE PLANE | | |
|---|---|---|---|---|---|---|---|---|
| | FEATURE PLANE NUMBER | BUFFER HEAD ADDRESS (MEMORY NUMBER) | BUFFER SIZE | HEAD LINK NUMBER | NUMBER OF LINKS | FEATURE PLANE NUMBER | BUFFER HEAD ADDRESS (MEMORY NUMBER) | BUFFER SIZE |
| FIRST CNN CALCULATION | FIRST FEATURE PLANE | ADDR1 (FIRST MEMORY) | L1 | A0 | 0 | SECOND FEATURE PLANE | ADDR2 (SECOND MEMORY) | L2 |
| SECOND CNN CALCULATION | SECOND FEATURE PLANE | ADDR2 (SECOND MEMORY) | L2 | A0 | 0 | THIRD FEATURE PLANE | ADDR3 (FIRST MEMORY) | L3 |
| THIRD CNN CALCULATION | THIRD FEATURE PLANE | ADDR3 (FIRST MEMORY) | L3 | A0 | 0 | FOURTH FEATURE PLANE | ADDR4 (SECOND MEMORY) | L4 |
| FOURTH CNN CALCULATION | FIRST FEATURE PLANE | ADDR1 (FIRST MEMORY) | L1 | A0 | 3 | FIFTH FEATURE PLANE | ADDR5 (THIRD MEMORY) | L5 |

| LINK NUMBER | ADDITIONAL INPUT FEATURE PLANE | | |
|---|---|---|---|
| | FEATURE PLANE NUMBER | BUFFER HEAD ADDRESS (MEMORY NUMBER) | BUFFER SIZE |
| A0 | SECOND FEATURE PLANE | ADDR2 (SECOND MEMORY) | L2 |
| A1 | THIRD FEATURE PLANE | ADDR3 (FIRST MEMORY) | L3 |
| A2 | FOURTH FEATURE PLANE | ADDR4 (SECOND MEMORY) | L4 |
| A3 | NO INFORMATION | NO INFORMATION | NO INFORMATION |

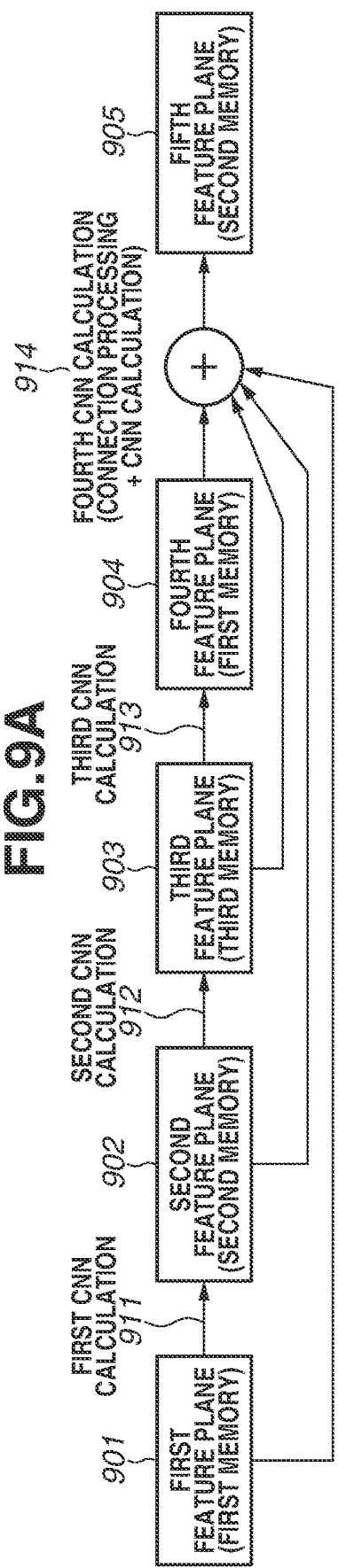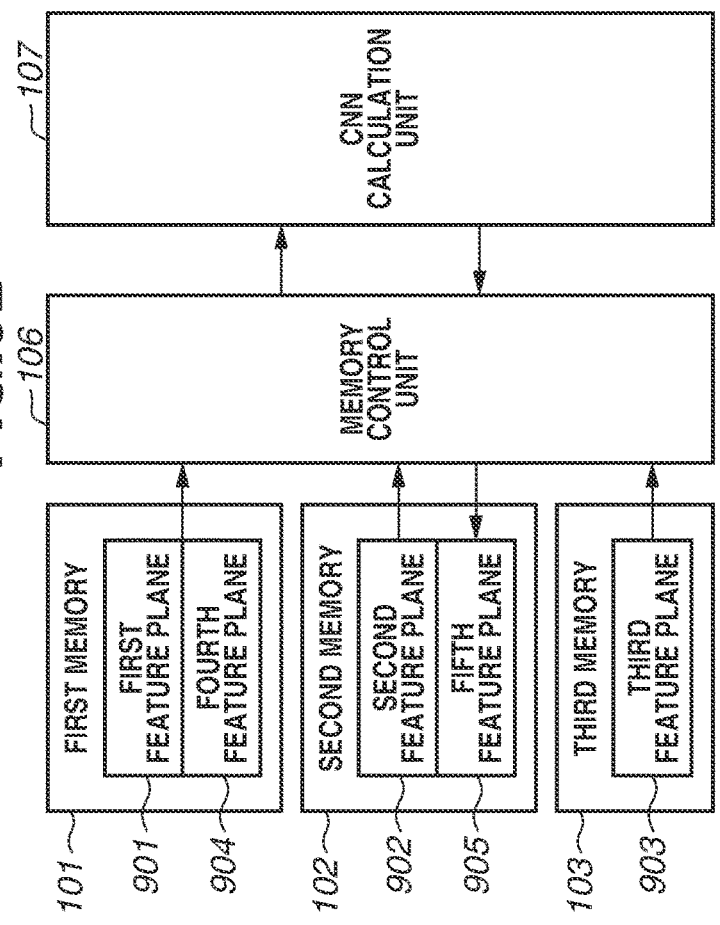

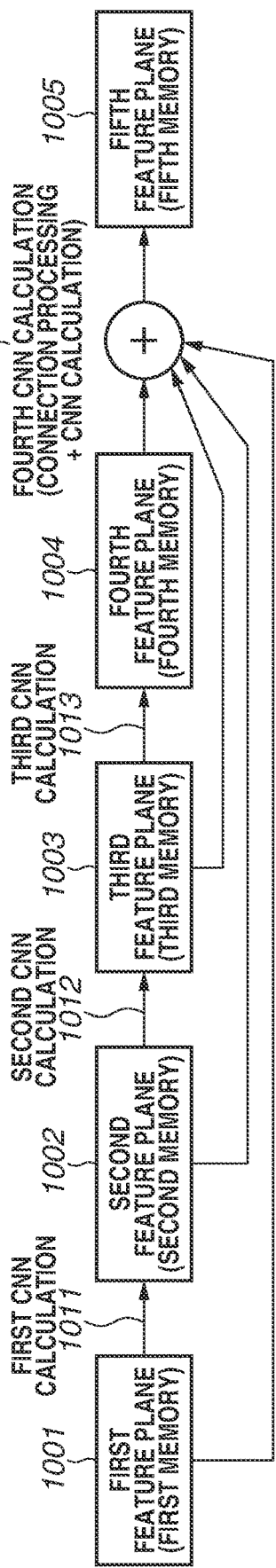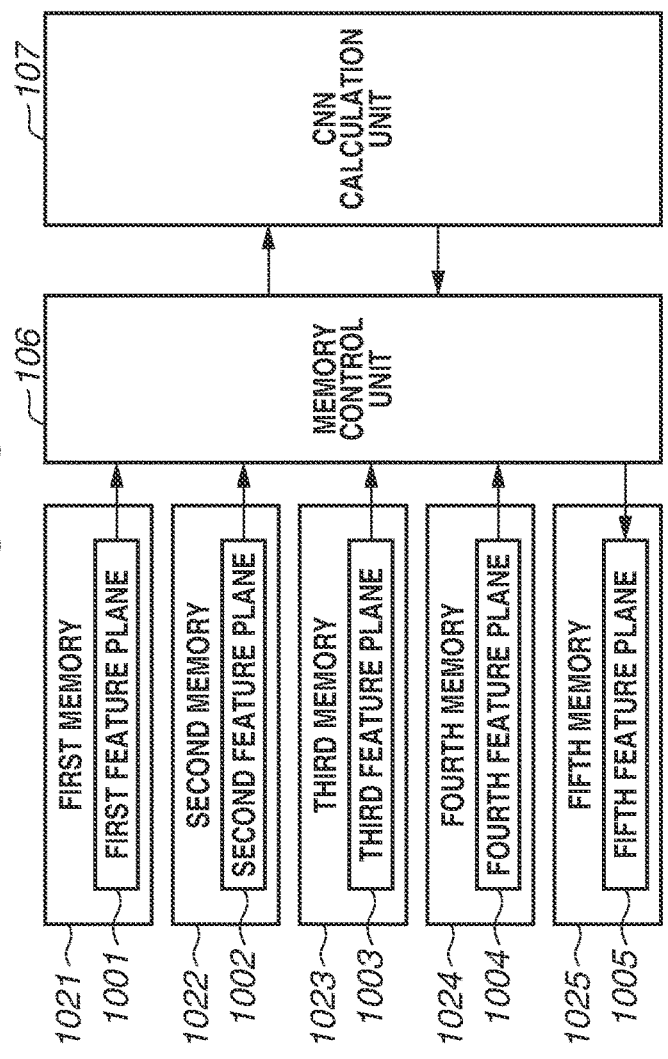

CALCULATION PROCESSING APPARATUS AND CALCULATION PROCESSING METHOD

BACKGROUND

Field of the Disclosure

The present disclosure relates to a calculation processing apparatus and a calculation processing method of performing calculation processing on a feature plane of a neural network.

Description of the Related Art

A recognition processing apparatus using a convolutional neural network (hereinafter, referred to as CNN) has a complicated network configuration in order to improve recognition accuracy. For example, there has appeared a network having skip connection in which one layer is connected to another layer in the latter stage while skipping continuous connection of layers. Such a network is represented by, for example, U-Net and residual neural networks (ResNet).

This type of network involves hardware to support the skip connection as hardware for accelerating CNN calculation. In processing of the skip connection, a feature plane of a layer in the preceding stage and a feature place skipping from another layer are connected to each other to form a connected feature plane. The connection is operation for connecting feature planes each with two or more sides having the same size in height and width, in the channel (depth) direction. Further, the CNN calculation is performed using the connected feature plane as an input, to create a feature plane on a subsequent layer.

On the other hand, in continuous processing in which output data obtained by processing input data is used as input data for the next processing, a ping-pong buffer scheme is known as an efficient memory allocation method for the input/output data. With a single port memory, data reading and data writing cannot be simultaneously performed. The process of reading input data from one memory and writing output data to the same memory simultaneously while performing processing on the input data at a CNN calculation unit impairs the processing efficiency of the calculation unit.

In the ping-pong buffer scheme, continuous data processing is performed by alternately or cyclically using two or more single port memories as an input memory and an output memory. In the ping-pong buffer scheme, a calculation circuit can simultaneously perform data input and data output with the input memory and the output memory allocated to different memories, allowing high-efficient processing to be performed by the CNN calculation unit. In a technique discussed in Japanese Patent Application Laid-Open No. 2021-168095, a CNN in which a plurality of layers is continuously connected is processed through the ping-pong buffer scheme using two memories.

In the CNN in which the plurality of layers is continuously connected, input feature planes and output feature planes can be allocated to different memories in all CNN calculations through memory allocation in the ping-pong buffer scheme using the two memories.

However, in processing for connecting feature planes including a plurality of input feature planes, it is necessary to make memory allocation such that an output memory holding an output feature plane is different from a plurality of input memories holding the input feature planes to be connected. In addition, the input feature planes to be connected each also have a connection relationship with another feature plane. Thus, memories are allocated to the input and output feature planes differently in all the connection relationships in the CNN, in addition to the connection processing.

All of the feature planes can be allocated to independent memories. In this case, N+1 memories are necessary to process connection of N input feature planes, increasing the circuit scale of the recognition processing apparatus. Alternatively, to disallow the circuit scale from being increased, it is necessary to change the CNN configuration so as to reduce the number of input feature planes to be connected. As a result, the usable CNN configuration is determined by the number of usable memories.

SUMMARY

According to an aspect of the present disclosure, a calculation processing apparatus includes a plurality of memories configured to hold feature planes each corresponding to a corresponding layer of a plurality of layers in a neural network, a calculation unit configured to perform calculation processing on the feature planes, and a memory control unit configured to read a feature plane from any of the plurality of memories and input the feature plane to the calculation unit, and to write a feature plane output from the calculation unit to any of the plurality of memories. In a case where a plurality of feature planes corresponding to different layers is connected and the calculation processing is performed, the memory control unit writes the plurality of feature planes to be connected, in memories other than a specific memory among the plurality of memories, reads the plurality of feature planes to be connected, from the memories other than the specific memory and inputs the feature planes to the calculation unit, and writes the feature plane output from the calculation unit in the specific memory.

Further features of the present disclosure will become apparent from the following description of exemplary embodiments with reference to the attached drawings.

BRIEF DESCRIPTION OF THE DRAWINGS

FIG. 4 is a table illustrating memory control instruction data according to one or more aspects of the present disclosure.

FIG. 7 is a table illustrating memory control instruction data according to one or more aspects of the present disclosure.

FIG. 8 is a table illustrating memory control instruction data according to one or more aspects of the present disclosure.

FIGS. 9A and 9B are diagrams illustrating memory access with three memories in use for feature planes.

FIGS. 10A and 10B are diagrams illustrating memory access with many memories in use for feature planes.

DESCRIPTION OF THE EMBODIMENTS

Some exemplary embodiments of the present disclosure will be described in detail with reference to drawings. Configurations described in the following exemplary embodiments are representative examples, and the scope of the present disclosure is not necessarily limited to the specific configurations.

Configuration of Recognition Processing Apparatus

Figure 1:
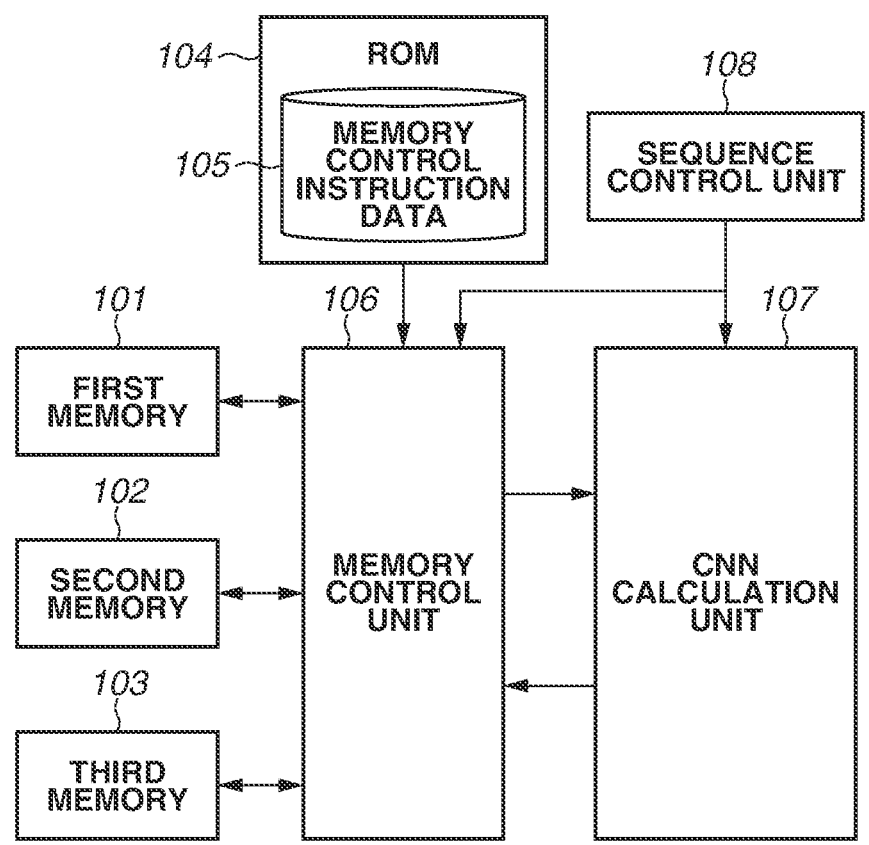
FIG. 1 is a block diagram illustrating the configuration of a recognition processing apparatus according to one or more aspects of the present disclosure.

FIG. 1 is a block diagram illustrating a configuration example of a recognition processing apparatus as an example of a calculation processing apparatus according to a first exemplary embodiment. For example, the recognition processing apparatus recognizes the type of a subject in an input image, and recognizes the presence/absence and the presence position of a specific subject in the input image, based on features extracted from the input image by convolutional neural network (CNN). The recognition processing apparatus is composed of pieces of hardware, and includes first to third memories 101 to 103, a read-only memory (ROM) 104, a memory control unit 106, a CNN calculation unit 107, and a sequence control unit 108.

The first to third memories 101 to 103 are random-access memories (RAMs), and are used as buffer regions for temporarily holding feature planes to be calculated and feature planes as results of calculation when CNN calculation is performed. In the present exemplary embodiment, the recognition processing apparatus includes three memories, namely, the first to third memories 101 to 103. In the present exemplary embodiment, each of the three memories is a single port memory.

Single port memories are inexpensive and small in circuit scale, but have characteristics in which data reading and data writing to a memory cannot be simultaneously performed. With a single port memory in use in combination with a circuit that simultaneously performs data input and data output, data writing cannot be performed while data reading is performed, during which processing performance of the circuit cannot be sufficiently exerted. In the present exemplary embodiment, a memory allocating method will be disclosed which can maximize the processing performance of the CNN calculation unit 107 with the single port memories in use.

The ROM 104 stores memory control instruction data 105 that instructs allocation of the three memories as input/output memories every CNN calculation. The memory control unit 106 reads the memory control instruction data 105 every CNN calculation, reads input feature planes from one or more of the first to third memories based on the memory control instruction data 105, and supplies the input feature planes to the CNN calculation unit 107. Simultaneously, the memory control unit 106 writes an output feature plane as an output result of the CNN calculation unit 107 to one of the first to third memories 101 to 103.

The CNN calculation unit 107 performs calculation, such as convolution and pooling. The sequence control unit 108 performs sequence control on the recognition processing apparatus. The configuration of the recognition processing apparatus realizing the present exemplary embodiment is not limited to the configuration illustrated in FIG. 1.

Description of Operation of Recognition Processing Apparatus

Operation of the recognition processing apparatus according to the present exemplary embodiment will be described with reference to a CNN configuration illustrated in FIG. 2, address maps of feature plane data in the memories illustrated in FIG. 3, and the memory control instruction data 105 for each CNN calculation illustrated in FIG. 4.

First, an example of the CNN configuration according to the present exemplary embodiment will be described with reference to FIG. 2. First CNN calculation 211 is performed using a first feature plane 201 as an input feature plane to output a second feature plane 202 as an output feature plane. Thereafter, second CNN calculation 212 is performed using the second feature plane 202 as an input feature plane to output a third feature plane 203. Likewise, the network up to a fourth feature plane 204 is connected in series. On the other hand, fourth CNN calculation 214 is special calculation of performing processing for connecting a plurality of input feature planes and CNN calculation using a connected feature plane as an input. The processing for connecting feature planes is operation for connecting two or more feature planes having the same width and height sizes, in the channel (depth) direction. In the fourth CNN calculation 214, first to fourth feature planes 201 to 204 are connected in the channel direction. Further, the fourth CNN calculation 214 performs the CNN calculation using a connected feature plane as an input to output a fifth feature plane 205.

Figure 3:
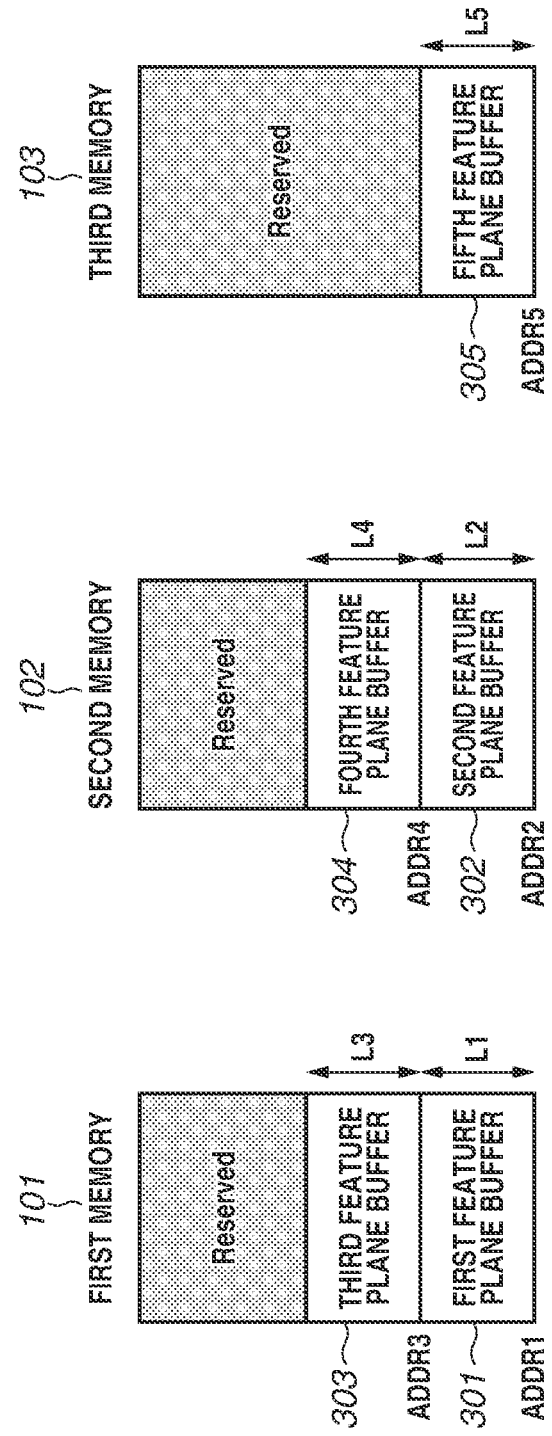
FIG. 3 is a diagram illustrating address maps of memories according to one or more aspects of the present disclosure.

FIG. 3 illustrates memory maps of feature plane buffer regions for storing feature plane data according to the present exemplary embodiment. FIG. 3 illustrates allocation of first to fifth feature plane buffer regions 301 to 305 to the first to third memories 101 to 103, head addresses ADDR1 to ADDR5 of the respective buffer regions, and buffer sizes (number of buffer lines) L1 to L5.

The memory control instruction data 105 according to the present exemplary embodiment will be described with reference to FIG. 4. The memory control instruction data 105 is prepared for each of the CNN calculation 211 to 214. Four pieces of memory control instruction data 105 for the first to fourth CNN calculation 211 to 214 are prepared based on the CNN configuration described with reference to FIG. 2. The memory control instruction data for each CNN calculation includes data indicating the buffer head address of the reading destination of the input feature plane data in the CNN calculation, and data indicating the buffer size (number of buffer lines). The memory control instruction data for each CNN calculation further includes data indicating the buffer head address of the writing destination of the output feature plane data, and data indicating the buffer size.

Assignment of unique addresses as memory addresses to the first memory to the third memory allows a memory number to be distinguished only by the designation of the buffer head address. For this reason, information on memory numbers in FIG. 4 is unnecessary for implementation. In this example, the memory numbers are illustrated together to use in description. Further, feature plane numbers in FIG. 4 are also illustrated to use in description. With buffer head addresses distinguishable, the feature plane numbers are distinguishable.

First, the memory control instruction in the first CNN calculation 211 will be described. The memory control instruction in the first CNN calculation 211 is instruction data for performing the CNN calculation using the first feature plane 201 as an input to output the second feature plane 202 as an output feature plane. A buffer region 301 to store the first feature plane 201 as the input feature plane is designated to the range of a size L1 with a head address ADDR1 of the first memory.

Likewise, a buffer region 302 to store the second feature plane 202 as the output feature plane is designated to the range of a size L2 with a head address ADDR2 of the second memory. The memory control instruction data in the second CNN calculation 212 and the third CNN calculation 213 is similar in how to read memory control instruction data to the memory control instruction data in the first CNN calculation 211, and the description thereof will be omitted.

Next, the memory control instruction data in the fourth CNN calculation 214 will be described. The memory control instruction data in the fourth CNN calculation 214 is instruction data for inputting the first to fourth feature planes 201 to 204 as the input feature planes, connecting the four feature planes in the channel direction, and performing the CNN calculation to output the fifth feature plane 205 as the output feature plane. Since the four feature planes 201 to 204 are input, buffer regions 301 to 304 for storing the four feature planes are designated with information on four buffer head addresses and four buffer sizes.

The buffer region 301 has a range designated with the head address ADDR1 of the first memory 101 and the size L1, the buffer region 302 has a range designated by the head address ADDR2 of the second memory 102 and the size L2, the buffer region 303 has a range designated by the head address ADDR3 of the first memory 101 and the size L3, and the buffer region 304 has a range designated by the head address ADDR4 of the second memory 102 and the size L4. The output feature plane is the fifth feature plane 205, and the buffer region 305 has a range designated by the head address ADDR5 of the third memory 103 and the size L5.

Operation of the recognition processing apparatus using the memory control instruction data 105 illustrated in FIG. 4 will be described. It is assumed that the memories are all single port memories and that the CNN calculation unit 107 can maximize its processing performance by simultaneously performing input and output of feature plane data. Thus, the buffer regions for storing input feature planes and output feature planes are allocated to the first to third memories 101 to 103 differently from each other. In addition, to save memory mounting, the following is a description of the CNN calculation that processes a feature plane in units of blocks or lines, and the feature plane buffers in the intermediate layer of the CNN that are each a ring buffer holding a part of the feature plane, but the configurations are not limited thereto. The first feature plane buffer 301 and the fifth feature plane buffer 305 are buffers corresponding to the input layer and the output layer of the CNN, respectively, so that the first feature plane buffer 301 and the fifth feature plane buffer 305 are frame buffers, which can hold feature plane data on the entire region.

First, as a starting processing of the CNN calculation, the first feature plane 201 as starting data for the CNN calculation is disposed in the first feature plane buffer 301 of the first memory 101 by using a direct memory access controller (DMAC, not illustrated). The memory control unit 106 reads the memory control instruction data 105 for the first to fourth CNN calculation 211 to 214 from the ROM 104, and holds the memory control instruction data 105 in a register of the memory control unit 106.

Next, the recognition processing apparatus operates based on control signals from the sequence control unit 108. The sequence control unit 108 transmits a control signal for performing the first CNN calculation 211 to the memory control unit 106 and the CNN calculation unit 107. The CNN calculation unit 107 receives kernel data for performing the first CNN calculation 211 from a kernel data supplying unit (not illustrated), and holds the kernel data in a register of the CNN calculation unit 107. In the following, the description thereof will be omitted.

The memory control unit 106 reads the first feature plane 201 in units of blocks from the first feature plane buffer 301 of the first memory 101 based on the memory control instruction data for the first CNN calculation 211, and transmits the first feature plane 201 to the CNN calculation unit 107. The CNN calculation unit 107 performs the CNN calculation using the first feature plane 201 received from the memory control unit 106 and the kernel data, and transmits the second feature plane 202 as a calculation result to the memory control unit 106 in units of blocks. The memory control unit 106 writes the second feature plane 202 to the second feature plane buffer 302 of the second memory 102 in units of blocks based on the memory control instruction data.

After the feature plane 202 as the amount data for starting the second CNN calculation 212 is accumulated in the second feature plane buffer 302, the sequence control unit 108 transmits a control signal for performing the second CNN calculation 212 to the memory control unit 106 and the CNN calculation unit 107. The memory control unit 106 reads the second feature plane 202 in units of blocks from the second feature plane buffer 302 of the second memory 102 based on the memory control instruction data for the second CNN calculation 212. Further, the memory control unit 106 transmits the second feature plane 202 to the CNN calculation unit 107, and writes the third feature plane 203 received from the CNN calculation unit 107 to the third feature plane buffer 303 of the first memory 101 in units of blocks.

Next, until the feature plane 203 as the amount of data for performing the third CNN calculation 213 is accumulated in the third feature plane buffer 303, the first CNN calculation 211 and the second CNN calculation 212 are alternately performed to accumulate data in the third feature plane buffer 303. After the feature plane 203 for performing the third CNN calculation 213 is accumulated in the third feature plane buffer 303, the third CNN calculation 213 is performed.

Finally, operation of the fourth CNN calculation 214 as a feature of the present exemplary embodiment will be described. In the fourth CNN calculation 214, the first to fourth feature planes 201 to 204 are read from the first and second memories 101 and 102, and processing is performed to connect the four feature planes in the channel direction. The memory control instruction data for the fourth CNN calculation 214 includes four items in total.

First, the memory control unit 106 reads the first feature plane 201 in units of blocks from the first feature plane buffer 301 of the first memory 101 based on the first item in the memory control instruction data for the fourth CNN calculation 214, and transmits the first feature plane 201 to the CNN calculation unit 107. Subsequently, the memory control unit 106 reads the second feature plane 202 in units of blocks from the second feature plane buffer 302 of the second memory 102 based on the second item in the memory control instruction data, and transmits the second feature plane 202 to the CNN calculation unit 107. Likewise, the memory control unit 106 reads the third feature plane 203 in units of blocks from the third feature plane buffer 303 of the first memory 101 based on the third item in the memory control instruction data, and transmits the third feature plane 203 to the CNN calculation unit 107. Further, the memory control unit 106 reads the fourth feature plane 204 in units of blocks from the fourth feature plane buffer 304 of the second memory 102 based on the fourth item in the memory control instruction data, and transmits the fourth feature plane 204 to the CNN calculation unit 107.

The readout of the feature plane data 201 to 204 from the memories based on the first to fourth items in the memory control instruction data and the data transmission to the CNN calculation unit 107 are sequentially performed. The first feature plane 201 and the third feature plane 203 are simultaneously allocated to the first memory 101, and the second feature plane 202 and the fourth feature plane 204 are simultaneously allocated to the second memory 102; however, no issues arise because the feature plane data is sequentially read, which means that reading access is not simultaneously performed.

Since the first to fourth feature planes 201 to 204 are successively transmitted, the CNN calculation unit 107 can handle the first to fourth feature planes 201 to 204 as feature plane data connected in the channel direction. The CNN calculation unit 107 performs the CNN calculation using the connected feature planes received from the memory control unit 106 and the kernel data, and transmits the fifth feature plane 205 as the calculation result to the memory control unit 106 in units of blocks. The memory control unit 106 writes the fifth feature plane 205 to the fifth feature plane buffer 305 of the third memory 103 in units of blocks based on the memory control instruction data.

Method of Allocating Feature Plane Buffer to Memory

In the present exemplary embodiment, a general-purpose memory control instruction (memory allocation method) will be disclosed in which, in each of the CNN calculation 211 to 214, the input feature plane and the output feature plane are allocated to the first to third memories 101 to 103 differently from each other, which enables readout of an input feature plane from one memory and writing of an output feature plane to another memory to be simultaneously performed, maximizing the calculation performance of the CNN calculation unit 107.

In particular, in the CNN configuration including connection of the feature planes, it is difficult to allocate input feature planes and output feature plane to different memories in the connection processing in the existing cyclic memory allocation method using the ping-pong buffer scheme.

In the following, issues in the existing memory allocation method will be described with reference to FIGS. 9A to FIG. 11. FIGS. 9A and 9B are diagrams illustrating, as a first existing example, memory access with three memories in use for feature planes. FIG. 9A illustrates an example with the three memories 101 to 103 cyclically allocated to continuous layers 901 to 905 of a CNN using the ping-pong buffer scheme. In this case, in the fourth CNN calculation 914, four input feature planes 901 to 904 (feature planes 902-904 are the calculation results of cnn calculation 911-913) are connected (The expression "concatenate" is also often used instead of "connect".). As illustrated in FIG. 9B, the second memory 102 is allocated to a second feature plane 902 as an input, and the second memory 102 is also allocated to a fifth feature plane 905 as an output.

The second memory 102 is a single port memory, so that reading of the second feature plane 902 from the second memory 102 and writing of the fifth feature plane 905 to the second memory 102 cannot be simultaneously performed. The CNN calculation unit 107 cannot process data while waiting for reading of the second feature plane 902 or writing of the fifth feature plane 905, impairing the processing performance.

FIGS. 10A and 10B are diagrams illustrating, as a second existing example, memory access with many memories in use for feature planes. FIG. 10A illustrates an example in which the number of memories is increased to five, and input feature planes and output feature planes are allocated to different memories by cyclically using the five memories for first to fifth feature planes 1001 to 1005. As illustrated in FIG. 10B, allocating the feature planes to different memories makes it possible to avoid conflict of memory access. On the other hand, the increased number of memories increases the circuit scale of the recognition processing apparatus. FIG. 10A illustrates an example in which four feature planes are connected. To connect N input feature planes by a similar method, N+1 memories are used.

Figure 11:
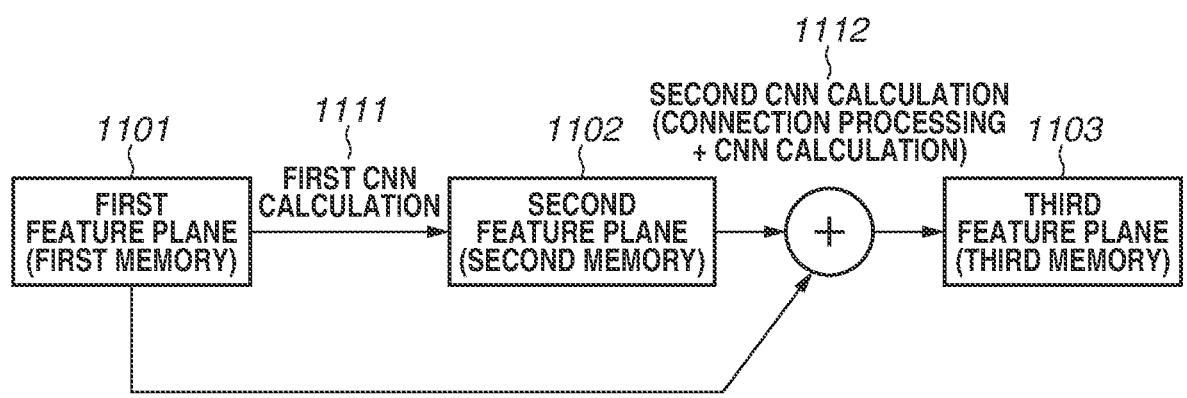
FIG. 11 is a diagram illustrating memory allocation with a reduced number of connections of input feature planes.

FIG. 11 is a diagram illustrating, as a third existing example, memory allocation with a reduced number of connections of input feature planes. This is an example in a case where the CNN configuration is changed to reduce the number of input feature planes to be connected. The number of input feature planes to be connected is limited to two, which makes it possible to allocate input feature planes and output feature planes to different memories. However, it is not preferable to restrict the processible CNN configuration with implementation of the recognition processing apparatus.

In light of the above-described issues, memory allocation according to the present exemplary embodiment will be described. The key to the memory allocation according to the present exemplary embodiment is that, among a plurality of memories mounted on the recognition processing apparatus, an independent memory is used as a memory dedicated to an output feature plane when input feature planes are connected. The recognition processing apparatus according to the present exemplary embodiment is equipped with the three memories. The third memory 103 is used as a memory dedicated to the output feature plane when the input feature planes are connected. Further, the first memory 101 and the second memory 102 that are memories other than the dedicated memory are used as memories for the input feature planes to be connected. The independent third memory 103 is used as the dedicated output feature plane memory, and is explicitly distinguished from the first and second memories 101 and 102 used as the input feature plane memories, which makes it possible to prevent the input/output memories from conflicting with each other in the connection processing.

Further, to the feature planes 201 to 204 involved in input of the connection, the first memory 101 and the second memory 102 are alternately allocated. Given only the fourth CNN calculation 214 performing connection, even if the plurality of input feature planes 201 to 204 to be connected are all allocated to the first memory 101 and the output feature plane is allocated to the third memory 103, it is possible to prevent the input/output memories from conflicting with each other in the connection. However, the plurality of input feature planes 201 to 204 to be connected each also have a connection relationship of the corresponding CNN calculation of the CNN calculation 211 to 213 with the corresponding feature plane(s) of the feature planes 201 to 204 in the CNN, so that the input feature planes and the output feature planes are allocated to different memories in all the connection relationships.

Figure 2:
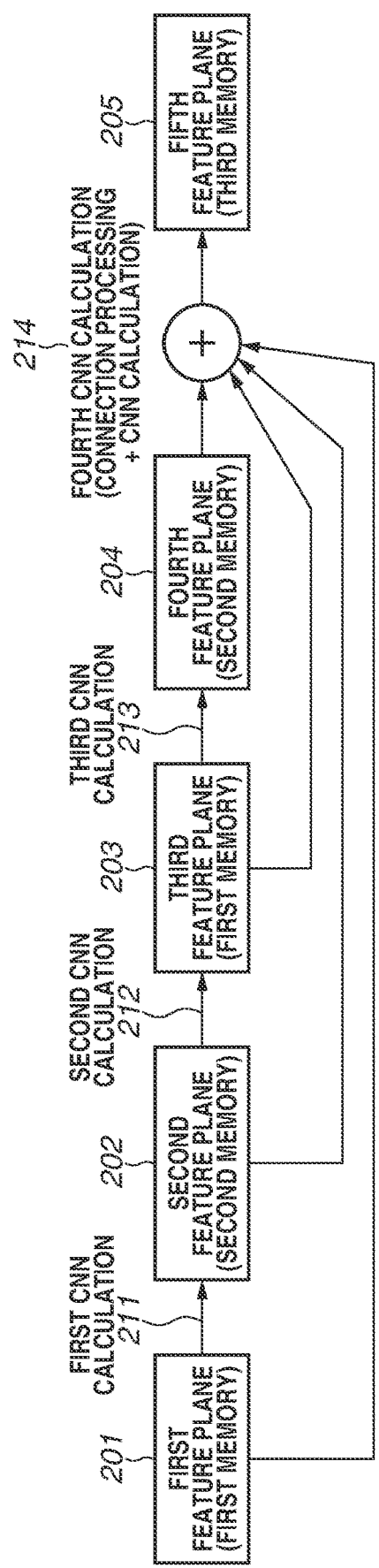
FIG. 2 is a diagram illustrating a convolutional neural network (CNN) configuration according to one or more aspects of the present disclosure.

For example, if the first to fourth feature planes 201 to 204 are all allocated to the first memory 101 in FIG. 2, data on the first and second feature planes 201 and 202 is input to and output from the same first memory 101 in the first CNN calculation 211, impairing the processing performance of the CNN calculation unit 107. For this reason, memory allocation of the first to fourth feature planes 201 to 204 as inputs of the connection is made alternately using the first and second memories 101 and 102. This method avoids memory access conflict of the input/output feature planes in the fourth CNN calculation 214 while avoiding memory access conflict of the input/output feature planes in the first to third CNN calculation 211 to 213.

Using the memory allocation method according to the present exemplary embodiment makes it possible to process connection of any number of input feature planes only by three memories of the first to third memories 101 to 103. Four or more memories are unnecessary. In the memory allocation using the normal ping-pong buffer scheme, to process the CNN configuration including connection of N feature planes, at least N+1 memories are used. In contrast, using the memory allocation method according to the present exemplary embodiment makes it possible to reduce the number of memories, and to achieve circuit scale reduction and power saving. In addition, from another viewpoint, the processible CNN configuration is not restricted by the number of memories mounted on the recognition processing apparatus.

As described above, in the CNN configuration including connection of the feature planes, the input feature planes and the output feature planes can be generally allocated to different memories in each CNN calculation.

The memory control instruction data illustrated in FIG. 4 is a result of memory allocation made on the CNN illustrated in FIG. 2 based on the memory allocation method according to the present exemplary embodiment. In the fourth CNN calculation 214 for connecting the plurality of feature planes, the first memory 101 and the second memory 102 are allocated to the input feature planes, and the third memory 103 is allocated to the output feature plane. Thus, the input/output feature planes are arranged in the different memories. Further, in each of the first to third CNN calculation 211 to 213, the first memory 101 and the second memory 102 are used for the input feature planes and the output feature plane. Thus, the input/output feature planes are arranged in the different memories.

The memory allocation (creation of memory control instruction data 105) according to the present exemplary embodiment is performed by a program installed into an apparatus outside the recognition processing apparatus. For example, the program is installed as software into a personal computer (PC). The created memory control instruction data 105 is disposed in the ROM 104 of the recognition processing apparatus, and is used for control of the memory control unit 106. Analysis of the CNN configuration and reflection of an analysis result in memory allocation are complicated tasks. If the tasks are performed in the recognition processing apparatus, the circuit scale of the recognition processing apparatus is increased. The memory allocation can be performed by the external apparatus, which makes it possible to simplify the recognition processing apparatus, and to reduce the circuit scale. Further, the present exemplary embodiment is not limited to use of the above-described CNN analysis program. The method of creating the memory control instruction data is not limited as long as the memory control instruction data includes an instruction to select one memory for writing an output feature plane in the CNN calculation including connection processing, and to use the other memories alternately or cyclically for input feature planes in the connection processing.

As described above, in the present exemplary embodiment, the memory control has been described that can maximize the processing performance of the CNN calculation unit without conflict between memory access for an input feature plane and memory access for an output feature plane even in the CNN including the connection processing with a small number of memories in use. The configuration according to the present exemplary embodiment disallows the number of memories from being increased, providing a reduced circuit scale and power saving of the recognition processing apparatus.

A second exemplary embodiment will be described. In the first exemplary embodiment, the memory allocation method has been described for feature planes involved in connection. On the other hand, many CNNs include both feature planes involved in connection and feature planes not involved in connection. In the second exemplary embodiment, a memory allocation method for a CNN including feature planes not involved in connection will be described. The connection involves a plurality of input feature planes and one output feature plane. As illustrated in FIG. 3, while the input feature planes occupy large capacities of the first memory 101 and the second memory 102, the output feature plane occupies a small capacity of the third memory 103, leaving a memory space. To address this issue, the CNN feature planes not involved in the connection are alternately allocated to the three memories, the first to third memories 101 to 103, to reduce imbalance in memory usage. Further, to reduce imbalance in memory usages due to the connection, the third memory 103 may be more frequently used.

The recognition processing apparatus to which the second exemplary embodiment is applied has the same configuration as according to the first exemplary embodiment, and the description of the configuration will be omitted.

(Description of Operation of Recognition Processing Apparatus)

Figure 5:
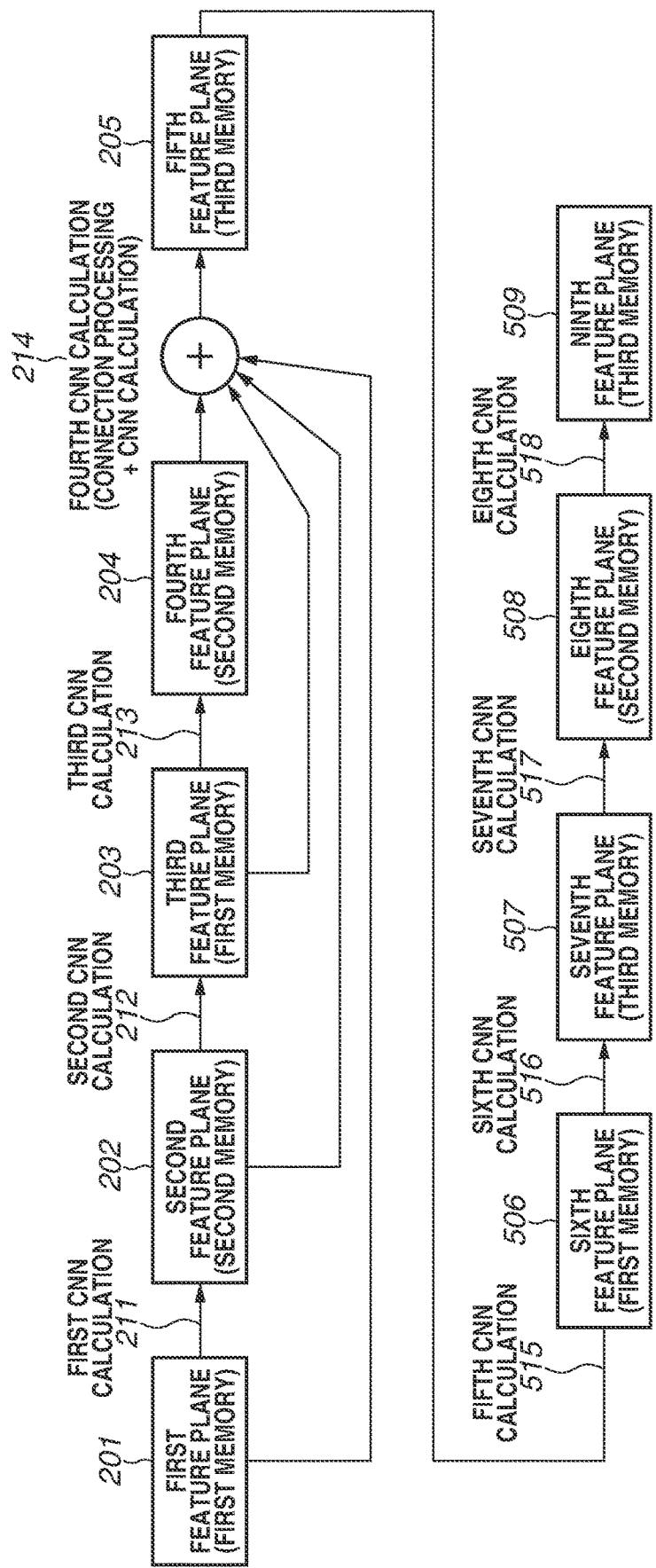
FIG. 5 is a diagram illustrating a CNN configuration according to one or more aspects of the present disclosure.

Operation of the recognition processing apparatus according to the present exemplary embodiment will be described with reference to a CNN configuration illustrated in FIG. 5, address maps of feature plane data in the memories illustrated in FIG. 6, and the memory control instruction data 105 for each CNN calculation illustrated in FIG. 7. Differences from the first exemplary embodiment will be described, and the redundant description thereof will be omitted.

An example of the CNN configuration according to the present exemplary embodiment will be described with reference to FIG. 5. The first to fifth feature planes 201 to 205 and the first to fourth CNN calculation 211 to 214 are the same as in the first exemplary embodiment. In the second exemplary embodiment, the network configuration additionally includes serial connection of sixth to ninth feature planes 506 to 509 and fifth to eighth CNN calculation 515 to 518. The first to fifth feature planes 201 to 205 are feature planes relating to the connection processing in the fourth CNN calculation 214, whereas the sixth to ninth feature planes 506 to 509 are feature planes not relating to the connection processing.

Figure 6:
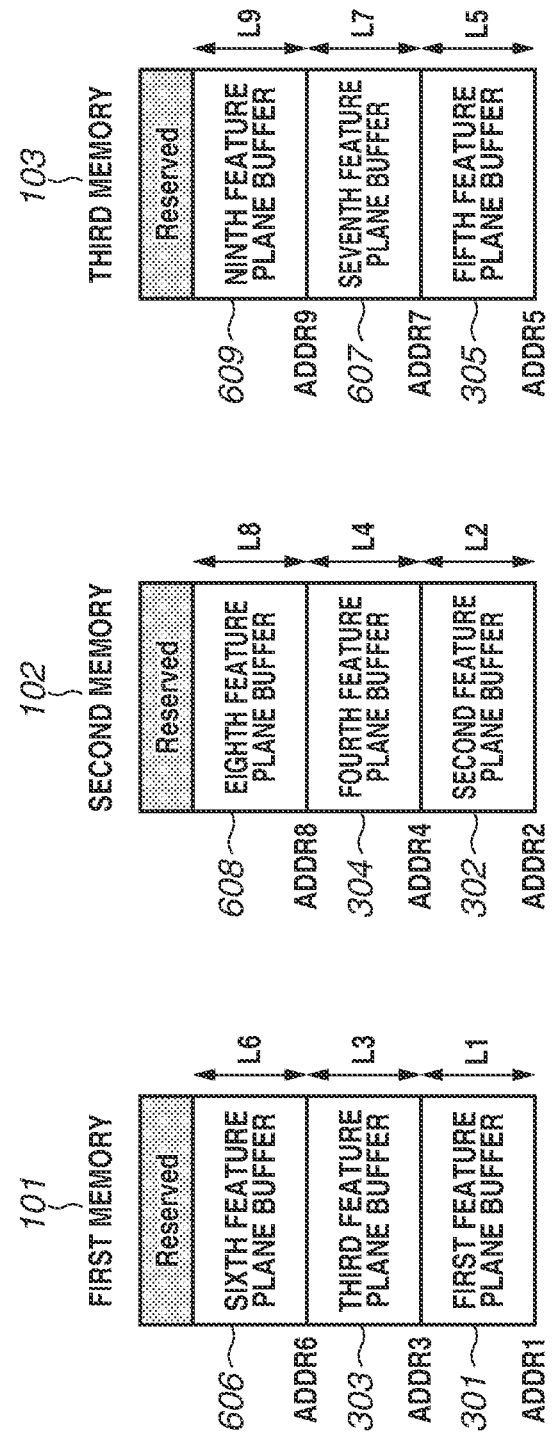
FIG. 6 is a diagram illustrating address maps of memories according to one or more aspects of the present disclosure.

FIG. 6 illustrates memory maps of feature plane buffers for storing feature plane data according to the second exemplary embodiment. The allocation of the first to fifth feature plane buffers 301 to 305 to the memories is the same as in the first exemplary embodiment. The allocation of sixth to ninth feature plane buffers 606 to 609 is additionally illustrated.

A remarkable point in FIG. 6 is that the seventh feature plane buffer 607 and the ninth feature plane buffer 609 that are not output feature planes of the connection are allocated to the third memory 103. The first to fifth feature planes 201 to 205 are feature plane relating to the connection processing in the fourth CNN calculation 214.

To allocate the input feature planes and the output feature plane in the connection processing to different memories, the third memory 103 is occupied by the fifth feature plane 205 that is the output feature plane of the connection. The first memory 101 and the second memory 102 are allocated to the first to fourth feature planes 201 to 204. However, since the sixth to ninth feature planes 506 to 509 do not relate to the connection, it is unnecessary to perform the memory allocation method described in the first exemplary embodiment.

In the memory allocation method described in the first exemplary embodiment, the number of input feature planes is large, but the number of output feature plane is one in the connection. As illustrated in FIG. 3, the input feature planes in the connection occupy the large allocated capacities of the first memory 101 and the second memory 102, whereas the capacity of the third memory 103 allocated to the output feature plane leaves a memory space. Thus, memory allocation for the feature planes not relating to the connection is performed using all of the three memories, which makes it possible to efficiently use the memories. In addition, to reduce imbalance in the memory usages in the connection processing, the third memory 103 for the feature planes not relating to the connection is more frequently used. In this manner, the feature plane buffers are allocated such that the usages of the first to third memories 101 to 103 become uniform as the whole of the CNN.

The memory control instruction data according to the second exemplary embodiment will be described with reference to FIG. 7. The memory control instruction data for the first to fourth CNN calculation 211 to 214 is the same as in FIG. 4 according to the first exemplary embodiment. In FIG. 7, the fifth to eighth CNN calculation 515 to 518 are added. As described with reference to FIG. 6, the three memories are all used for the fifth feature plane 205 and the sixth to ninth feature planes 506 to 509 not relating to the connection, providing efficient memory use. As for the first to fifth feature planes 201 to 205 relating to the connection, the usages of the first memory 101 and the second memory 102 are increased, but the usage of the third memory 103 is reduced. As for the sixth to ninth feature planes 506 to 509, the third memory 103 is more frequently used, and the feature plane buffers are allocated such that the usages of the first to third memories 101 to 103 become uniform as the whole of the CNN.

As described above, as for the feature planes not relating to the connection, a dedicated memory is not provided and the memories mounted on the recognition processing apparatus are arbitrarily allocated while all of the memories are alternately used as an input feature plane memory and an output feature plane memory among the layers. This makes it possible to uniformly and efficiently use the memories.

A third exemplary embodiment will be described. In the third exemplary embodiment, a method will be described of efficiently holding the memory control instruction data 105 in the memory control unit 106.

The memory control unit 106 reads the memory control instruction data 105 from the ROM 104, and uses the memory control instruction data 105 while holding the memory control instruction data 105 in the register in the memory control unit 106. In this case, it is assumed that each of the feature plane buffers is used as a ring buffer for memory saving. In other words, only a partial region of a feature plane is held in each of the feature plane buffers. For example, in the first CNN calculation 211, a block region of the first feature plane 201 is input, and a block region of the second feature plane 202 is output. When the block regions for performing the second CNN calculation 212 are accumulated in the second feature plane buffer, the second CNN calculation 212 is performed and the block region of the third feature plane 203 is output.

With insufficient data on the second feature plane 202 for the second CNN calculation 212, the processing returns to the first CNN calculation 211, and a new block region of the second feature plane 202 is created. As described above, the method is assumed in which the CNN calculation in the entire network is progressed while the processing in each of the CNN calculation is switched in units of blocks. Thus, if the memory control instruction data 105 is read from the ROM 104 every time the CNN calculation is switched, it takes a lot of time. Thus, the memory control unit 106 operates while storing the memory control instruction data 105 for all CNN calculation in the register in the memory control unit 106.

In this case, for example, with the hardware of the memory control unit 106 designed with a specification allowing connection of four feature planes at the maximum in each of the CNN calculation, it is necessary to create a register holding information on the number of CNN calculation times four input feature plane buffers. When such a register is created, most part of the register is not used, resulting in a lot of waste with a small number of connection processing in the CNN.

In the third exemplary embodiment, a method will be described of efficiently holding the memory control instruction data 105 in the memory control unit 106. As illustrated in FIG. 8, the memory control instruction data 105 for each CNN calculation holds one piece of information on an input feature plane buffer, one piece of information on an additional input feature plane link in a case where connection is performed, and one piece of information on an output feature plane buffer.

The additional input feature plane is implemented in a register different from the register for each CNN calculation, and has register setting that can be referred to from each CNN calculation. Information on the additional input feature plane includes information on a link number, a buffer head address, and a buffer size. The feature plane number and the memory number are mentioned for description purpose as with the input feature plane, and are unnecessary for the implementation. The additional input feature plane is referred to by using the link number and the number of links of the additional input feature plane link held for each CNN calculation.

For example, in the fourth CNN calculation, the information on the additional input feature plane is the link number A0 and the number of links 3. Thus, the three feature planes from the second to fourth feature planes corresponding to the three links of the link number A0 to A2 are added as the additional input feature planes. Further, in the CNN calculation not performing connection such as the first CNN calculation, the number of links is set to zero, which represents that no additional input feature plane is used.

As described above, the buffer information indicating the additional input feature planes to be connected is held in the different register, and is referred to from the memory control instruction data for each CNN calculation. This eliminates the need to hold the register for the number of CNN calculations times the maximum number of input feature planes to be connected. This makes it possible to reduce the amount of memory control instruction data, and to reduce the number of registers for holding the data.

A fourth exemplary embodiment will be described. In the first exemplary embodiment, the memories are single port memories. In the fourth exemplary embodiment, an example will be described of using a multiport memory, such as a dual port memory.

In the first exemplary embodiment, the memory allocation method has been described in which, in the connection processing in the CNN, the dedicated memory is allocated to the output feature plane of the connection to avoid access conflict with the input memory, maximizing the processing performance of the CNN calculation unit 107.

With a multiport memory, a plurality of ports, such as a reading port, a writing port, and a general-purpose reading/writing port, are provided as interfaces (I/Fs) in one memory. In this case, reading of an input feature plane and writing of an output feature plane in the connection processing are performed using a general-purpose reading/writing port increases input/output data in the connection processing. Thus, when data access is performed using a general-purpose reading/writing port, it takes a time to read and write data, and data transfer performance required by the CNN calculation unit 107 cannot be obtained.

Influence by slight delay in reading of the input data on the processing performance can be reduced by increasing the input data buffer size of the CNN calculation unit 107 and reading some extra amount of data in advance. On the other hand, when writing of output data is delayed and non-output data is accumulated in the CNN calculation unit 107, the CNN calculation unit 107 is stopped, which causes a major issue.

In the fourth exemplary embodiment, as a memory port for writing an output feature plane in the connection processing, one writing port among a plurality of ports of the multiport memory is used. The port for reading an input feature plane and the port for writing an output feature plane are separated from each other, which makes it possible to perform writing of the output feature plane from the CNN calculation unit 107 without delay. Thus, the CNN calculation processing can be performed without impairing the processing performance of the recognition processing apparatus.

According to the above-described exemplary embodiments, the connection of the feature planes in the neural network can be efficiently performed with a small number of memories without impairing calculation processing performance.

The present disclosure can be realized by supplying programs realizing one or more functions of the above-described exemplary embodiments to a system or an apparatus through a network or a storage medium, and causing one or more processors in a computer of the system or the apparatus to read and execute the programs.

Further, the present disclosure can be realized by a circuit (for example, application specific integrated circuits (ASIC)) realizing one or more functions.

While the exemplary embodiments of the present disclosure have been described above, the present disclosure is not limited to the exemplary embodiments, and can be variously modified and changed within the scope of the gist of the disclosure.

According to the exemplary embodiments, the calculation processing on feature planes in a neural network can be efficiently performed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-064773, filed Apr. 12, 2023, which is hereby incorporated by reference herein in its entirety.

What is claimed is:

1. A calculation processing apparatus comprising:
  a plurality of memories configured to hold feature planes each corresponding to a corresponding layer of a plurality of layers in a neural network;
  a calculation unit configured to perform calculation processing on the feature planes; and
  a memory control unit configured to read a feature plane from any of the plurality of memories and input the feature plane to the calculation unit, and to write a feature plane output from the calculation unit to any of the plurality of memories,
  wherein, in a case where a plurality of feature planes corresponding to different layers are connected and the calculation processing is performed, the memory control unit writes the plurality of feature planes to be connected, in memories other than a specific memory among the plurality of memories, reads the plurality of feature planes to be connected, from the memories other than the specific memory and inputs the feature planes to the calculation unit, and writes the feature plane output from the calculation unit in the specific memory, wherein, in a case where the calculation processing is performed without connecting the feature planes, the memory control unit allocates the memories to which the feature planes as targets of the calculation processing are written, based on the layers corresponding to the feature planes.

2. The calculation processing apparatus according to claim 1
wherein the plurality of memories is first, second, and third memories, and
wherein the memory control unit writes the plurality of feature planes to be connected, in the first memory and the second memory, and writes the feature plane output from the calculation unit in the third memory.

3. The calculation processing apparatus according to claim 2, wherein the memory control unit writes the plurality of feature planes to be connected, in one of the first memory and the second memory based on a relationship of the layers corresponding to the plurality of feature planes.

4. The calculation processing apparatus according to claim 1, wherein the memory control unit allocates a memory as a target of reading or writing of the feature planes, in accordance with a memory control instruction based on a network configuration of the neural network.

5. The calculation processing apparatus according to claim 4, wherein the memory control instruction is an instruction issued by an analysis apparatus outside the calculation processing apparatus based on an analysis result of the network configuration of the neural network.

6. The calculation processing apparatus according to claim 1, wherein the memory control unit selects, as a memory as a target of reading or writing of the feature planes, one memory from the plurality of memories based on a memory address.

7. The calculation processing apparatus according to claim 1, wherein the calculation processing is convolution calculation processing.

8. The calculation processing apparatus according to claim 1, wherein the plurality of memories are single port memories.

9. The calculation processing apparatus according to claim 1, wherein the memory control unit further includes a register, for each convolutional neural network (CNN) calculation, configured to hold information on one feature plane input to the calculation unit, information on one feature plane output from the calculation unit, and information on a feature plane to be connected with the input one feature plane.

10. The calculation processing apparatus according to claim 9, wherein the register holds a head address and a size as the information on the one feature plane, and holds a link number to another register and number of links as the information on the feature plane to be connected.

11. A calculation processing method in a calculation processing apparatus including a plurality of memories configured to hold feature planes each corresponding to a corresponding layer of a plurality of layers in a neural network, the method comprising:
performing calculation processing on the feature planes by a calculation unit; and
reading a feature plane from any of the plurality of memories and inputting the feature plane to the
calculation unit, and writing a feature plane output from the calculation unit to any of the plurality of memories,
wherein, in a case where a plurality of feature planes corresponding to different layers are connected and the calculation processing is performed, the plurality of feature planes to be connected are written in memories other than a specific memory among the plurality of memories, the plurality of feature planes to be connected are read from the memories other than the specific memory and are input to the calculation unit, and the feature plane output from the calculation unit is written to the specific memory,
wherein, in a case where the calculation processing is performed without connecting the feature planes, the memories to which the feature planes as targets of the calculation processing are written, based on the layers corresponding to the feature planes.

\* \* \* \* \*